Sept. 25, 1934.   A. H. BATES   1,974,639
VALVE FOR AN AUTOMOBILE HEATER
Filed April 7, 1930   2 Sheets-Sheet 1

Inventor
By Albert H. Bates

Sept. 25, 1934.  A. H. BATES  1,974,639
VALVE FOR AN AUTOMOBILE HEATER
Filed April 7, 1930   2 Sheets-Sheet 2
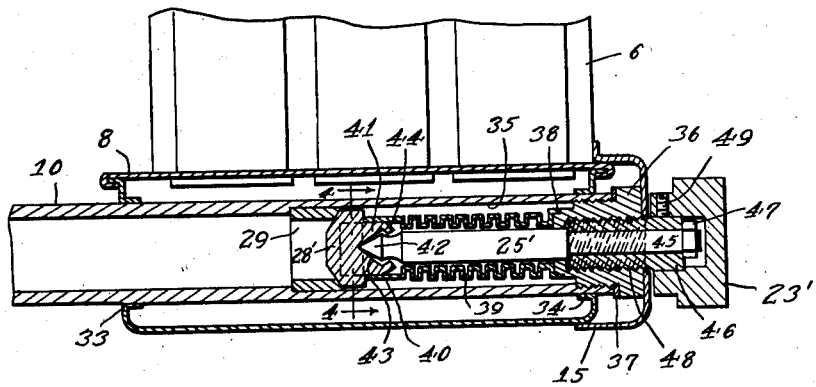
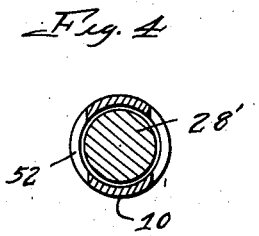
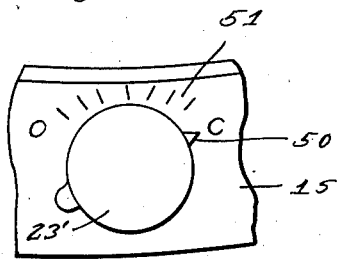

Patented Sept. 25, 1934

1,974,639

UNITED STATES PATENT OFFICE 1,974,639

VALVE FOR AN AUTOMOBILE HEATER

Albert H. Bates, Rockford, Ill., assignor to Burd High Compression Ring Company, Rockford, Ill., a corporation of Illinois Application April 7, 1930, Serial No. 442,105

1 Claim. (Cl. 257—159)

This invention relates to heaters for automotive vehicles, and more particularly those utilizing the heat in the liquid of the engine cooling system.

Heaters of the kind referred to consist of a radiator core for the passage of the hot water or other liquid therethrough and have means, such as an electric fan, for forcing air through the core to abstract the heat from the liquid for heating the car. One matter that has received considerable attention in connection with these heaters is that of controlling the heat so as to avoid discomfort especially in moderate weather. Thus far, two methods of control have been proposed. One method is to control the speed of the fan by means of a suitable plural speed switch, two-speed switches being most commonly used. The objection to that method is that it does not permit of as sensitive an adjustment as desired, nor does it afford the desired range of variation. The other method is that of regulating the flow of air by means of baffles on the front of the heater, but that again has been objected to as not affording quite the range of variation desired and as involving complicated constructions and proportionate expense. It is, therefore, the principal object of my invention to make it practical to control the heat delivery by regulating the flow of the liquid anywhere from zero to maximum flow, whereby to secure exactly the amount of heat desired without tampering with the fan or having to manipulate baffles. I am aware that heaters of this kind have been provided with a valve in the upper pipe connection under the hood. But this necessitates raising the hood to get at the same whenever it is desired to connect or disconnect the heater or regulate the flow of the liquid therethrough, and in some installations the valve cannot be made easily accessible. Naturally, too, such control was more or less ineffectual because it could not be made from the driver's seat, that is, it was not a direct form of control, and when an adjustment of the valve was made, it was merely a matter of guess-work as to the result thereby obtained.

According to my invention, the valve under the hood is eliminated, and a valve incorporated preferably in one of the tanks or headers of the heater itself for operation from the front of the heater and easily accessible from the driver's seat, so that changes in the adjustment can be made with the utmost ease and facility to regulate the heat to suit personal preference.

This application is in part a continuation of my application, Serial No. 371,343, filed June 17, 1929, which has now matured into Patent No. 1,881,068, issued Oct. 4, 1932.

The invention is illustrated in the accompanying drawings, wherein—

Fig. 3 is a view similar to Fig. 2 showing a different construction;

Fig. 4 is a sectional detail on the line 4—4 of Fig. 3, and

Fig. 5 is a fragmentary front view.

Similar reference numerals are applied to corresponding parts throughout the views.

Figure 1:
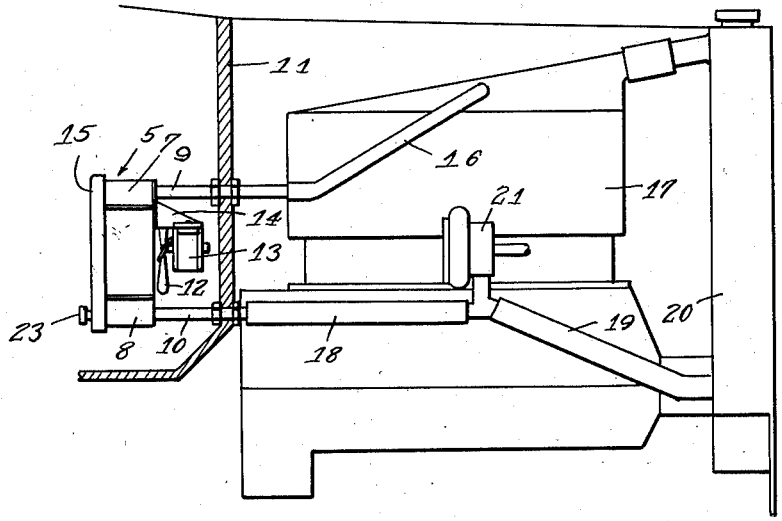
Figure 1 is a diagrammatic view showing a section through the front end of an automobile having the heater installed on the dash embodying the valve in accordance with my invention.

The heater, indicated generally by the reference numeral 5, is similar to that disclosed in my copending application, Serial No. 311,032, filed October 8, 1928, which has now matured into Patent No. 1,834,674, issued Dec. 1, 1931 and comprises a radiator core 6 having upper and lower header tanks 7 and 8, respectively, communicating with hot water supply and return pipes 9 and 10 extending through and clamped to the dash 11 of the automobile for support of the heater thereby. A fan 12, driven by the electric motor 13, insures a forced draft of air through the radiator 6 from the back thereof to abstract heat from the hot water circulated through the radiator and distribute the heat to all parts of the car. The motor 13 is suitably supported on a bracket 14, and it will be observed that a front plate 15 constitutes a marginal ornamental frame for the front of the radiator for the sake of appearance. The hot water supply pipe 9 has connection with a pipe or hose 16 tapped into the water jacket of the engine 17 at a point where the water attains the highest temperature and where it gets hot the quickest after the engine has been started, namely, in the head of the engine. The return pipe 10, on the other hand, has connection with another pipe or hose 18 tapped into the lower outlet hose connection 19 of the car radiator 20 between the latter and its water pump 21. From this much general description it will be evident that hot water, or whatever cooling fluid is used, is supplied to the radiator 6 from the engine 17 through the pipe 9, and that it flows downwardly through the radiator and back to the engine through the return pipe 10.

Figure 2:
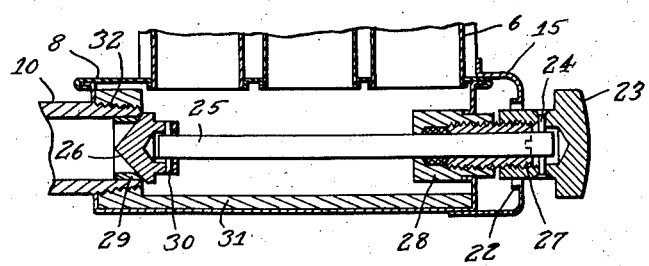
Fig. 2 is a central vertical section through one end of the heater and showing the valve incorporated in accordance with my invention.

Referring now to Fig. 2, it will be observed that I have provided an opening 22 in the front plate 15 for the reception of a knob 23 which is pinned, as shown at 24, onto the outer end of a stem 25 of a valve 26. The knob 23 is internally threaded, and threads on a bushing 27 suitably mounted in the front wall of the tank 8, the mounting including a stuffing box 28 to prevent leakage of water from the tank along the stem 25. The valve 26 is of a conical form and arranged to make wedging engagement with a tapered seat provided in a bushing 29 mounted in the end of the pipe 10. It is believed to be manifest that the unthreading of the knob 23 from the bushing 27 serves to back the valve 26 away from its seat, and vice versa when the knob 23 is turned the other way. The valve 26, it will be observed, has a loose pin connection 30 with the inner end of the stem 25 so that the valve takes its own seat and there is no necessity for the seat to be very accurately located with reference to the bushing 27; the valve can be closed tightly regardless of a slight discrepancy. In the fastening of the supply and return pipes 9 and 10 to the upper and lower tanks 7 and 8, cast brackets 31 are provided, riveted, welded, or otherwise suitably secured in place in the tanks and having the pipes threading therein, as indicated at 32.

In operation, when the valve 26 is wide open there is free circulation of the hot water through the radiator, and when the valve is closed tightly so that there can be no circulation, the heater is thrown out of operation and will remain cold regardless of the heating of the water in the jacket of the engine. This is true whether the valve is provided in connection with the supply pipe 9 or return pipe 10. The only reason the valve has been shown provided in connection with the return pipe 10, is that it is ordinarily handier to manipulate the valve in that position, and the knob therefore is more readily visible from the driver's seat. When the valve 26 is opened slightly to permit a little circulation of hot water through the radiator, just a little heat will be given off when the fan is operated, and, of course, the driver can adjust the valve to get exactly the amount of heat he prefers. The fact that the adjustment can be made from the driver's seat and without necessitating getting out of the car or even stopping the car is, of course, a decided advantage over having a valve under the hood, or in some other more or less inaccessible place. The control is as direct as it is possible to have; the moment the driver feels uncomfortable through overheating or lack of heat he can make the necessary adjustment while he is driving. There is, therefore, absolutely no guess-work connected with the operation of this valve, as there was with those located at remote or inaccessible points and which afforded only a more or less indirect control.

In Fig. 3, I have illustrated a different construction in which the pipe 10, or pipe 9 as the case may be, depending on whether the valve is inserted in the return or supply pipe, is extended through a flanged hole 33 in the back wall of the tank or header 8 and through another flanged hole 34 provided in the front wall, and is suitably soldered in place. If desired, a reinforcing bracket, similar to the bracket 31 previously mentioned, may be provided in connection with the pipe 10 inside the tank, but that is not believed necessary with this construction. The front end of the pipe is counter-bored, as indicated at 35, to a point approximately mid-way between the front and back walls, and a bushing 29, similar to that provided in the first construction, is mounted therein, as shown, to provide a seat for cooperation with the tapered valve 28'. A plug 36 is threaded in the front end of the pipe and compresses a copper-asbestos gasket 37 on the end of the pipe for a seal. The ornamental front plate 15 covers this plug, as indicated. The inner end of the plug is reduced, and an annular flange 38 provided on one end of a sylphon or bellows diaphragm 39 soldered or otherwise suitably secured thereto. The other end of the diaphragm has another annular flange 40 provided thereon, which is soldered or otherwise suitably secured on the reduced shank 41 of the valve 28'. A valve stem 25' extends through the diaphragm 39 and has a ball and socket or universal joint connection at its inner end with the valve 28', as by the entry of a conical head portion 42 in a larger tapered socket 43 provided in the valve. The valve has the rim of the socket swedged inwardly annularly, as indicated at 44, loosely to confine the head 42 in the socket. The outer end of the stem 25' is reduced, as at 45, and has a screw collet 46 fixed thereon, as by means of a nut 47 threading on the end of the stem. The collet 46 has the inner portion thereof threaded externally for threaded engagement with the central bore 48 provided in the plug 46, these threads having an extreme lead, so much so that a fractional turn, as for example, a half turn, is sufficient to move the stem 25' from a position corresponding to the fully closed position of the valve 28' to a position corresponding to the wide open position of the valve. The outer end of the collet 46 has the periphery thereof longitudinally serrated to snugly receive a knob 23', by means of which the collet is arranged to be turned. A set screw 49, threaded in the reduced portion of the knob against the collet, serves to fasten the knob firmly in place. I prefer to provide a pointer 50 on the knob, as indicated in Fig. 5, which, in the turning of the knob, sweeps over a scale 51 provided on the front plate 15, suitably indicating wide open position at one end of the scale and closed position at the other end and suitable fractions at intermediate points. Just in front of the bushing 29, providing the seat for the valve 28', the pipe 10 is milled on opposite sides to provide ports 52 establishing communication between the inside of the pipe and the tank.

In the operation of this valve it will be seen that the diaphragm 39 is arranged to be slightly contracted in the opening of the valve and expanded in the closing thereof, and serves to seal the stem 25' against any possible leakage of the water or other liquid along the same or about the collet. In other words, an easy working fit of the collet 46 in the plug or nut 36 is permitted without thereby incurring danger of leakage. Both in the closing and opening of the valve, the thrust is transmitted from the stem to the valve directly, and no stress, tensional or torsional, is placed on the diaphragm; it has an ordinary bellows action, and expands and contracts to accommodate itself to the position of the valve.

The invention is covered in the following claim in broad enough terms to embrace both constructions as well as all legitimate modifications and adaptations such as will no doubt occur to others as a result of this disclosure.

I claim:

A valve for an automobile heater of the type wherein a core has opposed header tanks for conducting heating medium into and out of the same, and heating medium supply and return pipes extending from the back walls of the header tanks adapted for support of the heater on a wall, the valve comprising an operating handle on the front of the heater in front of one of said header tanks and rotatable on an axis coincident with one of said pipes, a valve seat on said pipe, a valve in said tank to engage the seat, a stem connecting the valve and handle, and threaded means whereby the valve is moved relative to the seat in the turning of the handle, to open or close the pipe or regulate the flow of heating medium therethrough.

ALBERT H. BATES.